United States Patent
Liu et al.

(10) Patent No.: US 11,841,885 B2
(45) Date of Patent: Dec. 12, 2023

(54) MULTI-FORMAT CONTENT REPOSITORY SEARCH

(71) Applicant: International Business Machines Corporation, Armonk, NY (US)

(72) Inventors: Su Liu, Austin, TX (US); Debbie Anglin, Leander, TX (US); Boyi Tzen, Taipei (TW); Fan Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 282 days.

(21) Appl. No.: 17/236,091

(22) Filed: Apr. 21, 2021

(65) Prior Publication Data
US 2022/0342918 A1     Oct. 27, 2022

(51) Int. Cl.
| | |
|---|---|
| *G06F 16/33* | (2019.01) |
| *G10L 15/00* | (2013.01) |
| *G10L 19/00* | (2013.01) |
| *G10L 25/57* | (2013.01) |
| *H04N 19/44* | (2014.01) |
| *G06F 16/383* | (2019.01) |
| *G10L 15/18* | (2013.01) |
| *G10L 15/30* | (2013.01) |
| *G10L 15/26* | (2006.01) |
| *G06F 16/31* | (2019.01) |
| *G06F 16/338* | (2019.01) |
| *G10L 15/22* | (2006.01) |

(52) U.S. Cl.
CPC ........ *G06F 16/3331* (2019.01); *G06F 16/316* (2019.01); *G06F 16/338* (2019.01); *G06F 16/383* (2019.01); *G10L 15/005* (2013.01); *G10L 15/18* (2013.01); *G10L 15/22* (2013.01); *G10L 15/26* (2013.01); *G10L 15/30* (2013.01); *G10L 19/00* (2013.01); *G10L 25/57* (2013.01); *H04N 19/44* (2014.11)

(58) Field of Classification Search
CPC ... G06F 16/316; G06F 16/3331; G06F 16/383
USPC ........................................................ 707/741
See application file for complete search history.

(56) References Cited

U.S. PATENT DOCUMENTS

| | | | |
|---|---|---|---|
| 7,983,915 B2 | 7/2011 | Knight et al. | |
| 10,074,364 B1 * | 9/2018 | Wightman | ............ G10L 15/285 |

(Continued)

OTHER PUBLICATIONS

Google Cloud, Detecting language spoken automatically, 2021, https://cloud.google.com/speech-to-text/docs/multiple-languages.
(Continued)

*Primary Examiner* — Hosain T Alam
*Assistant Examiner* — Tracy M Mcghee
(74) *Attorney, Agent, or Firm* — Garg Law Firm, PLLC; Rakesh Garg; Nathan Rau

(57) ABSTRACT

An audio file format of an audio portion of a natural language content is determined. Using a trained audio language identification model, a human language included in the audio portion is identified. Using a trained audio to text model trained on the human language, the audio portion is converted to a corresponding set of text data. The set of text data is indexed. Using the indexed set of text data responsive to a search query, a search result is generated, the search query specifying a search including a non-textual portion of the natural language content.

17 Claims, 11 Drawing Sheets

(56) References Cited

U.S. PATENT DOCUMENTS

| | | |
|---|---|---|
| 2008/0270138 A1* | 10/2008 | Knight ................. G06F 16/434 704/E15.045 |
| 2015/0089368 A1 | 3/2015 | Lester et al. |
| 2015/0310107 A1 | 10/2015 | Alhakimi |
| 2016/0012047 A1 | 1/2016 | Houh et al. |
| 2017/0060862 A1 | 3/2017 | Wang et al. |
| 2018/0107673 A1 | 4/2018 | Goikhman et al. |
| 2019/0095716 A1 | 3/2019 | Shrestha et al. |
| 2019/0272289 A1 | 9/2019 | Choi et al. |

OTHER PUBLICATIONS

Taylor, How to Search and Find Specific Words or Phrases in Video or Audio Files, Feb. 11, 2016, https://diymarketers.com/how-to-search-and-find-specific-words-or-phrases-in-video-or-audio-files/.

* cited by examiner

MULTI-FORMAT CONTENT REPOSITORY SEARCH

BACKGROUND

The present invention relates generally to a method, system, and computer program product for content management. More particularly, the present invention relates to a method, system, and computer program product for multi-format content repository search.

A content repository stores natural language content such as text documents, audio, still images, and video. Often, the content repository acts as storage for a larger application such as a content management system or a document management system.

An audio coding format is a content representation format for storage or transmission of digital audio. Similarly, a video coding format is a content representation format for storage or transmission of digital video. Some audio and video coding formats are uncompressed, while others are compressed using a lossless or lossy compression technique. Audio and video content encoded in a particular coding format is typically encapsulated within a container format. A container format is a file format that allows multiple data streams to be embedded into a single file. A container file typically also includes metadata for identifying the included data streams, providing subtitles and chapter information, and synchronization information used to synchronize streams (e.g. audio with corresponding video) during playback. Some examples of container formats, typically indicated by a corresponding filename extension, are the AIFF, Waveform Audio File Format (WAV), and MPEG Layer III Audio (MP3) formats (for audio), TIFF (Tagged Image File Format) for still images, and MP4 (a standardized audio and video container for content encoded according to the international MPEG-4 standard.

SUMMARY

The illustrative embodiments provide a method, system, and computer program product. An embodiment includes a method that determines an audio file format of an audio portion of a natural language content. An embodiment identifies, using a trained audio language identification model, a human language included in the audio portion. An embodiment converts, using a trained audio to text model trained on the human language, the audio portion to a corresponding set of text data. An embodiment indexes the set of text data, the indexing generating an indexed set of text data. An embodiment generates, using the indexed set of text data responsive to a search query, a search result, the search query specifying a search including a non-textual portion of the natural language content.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
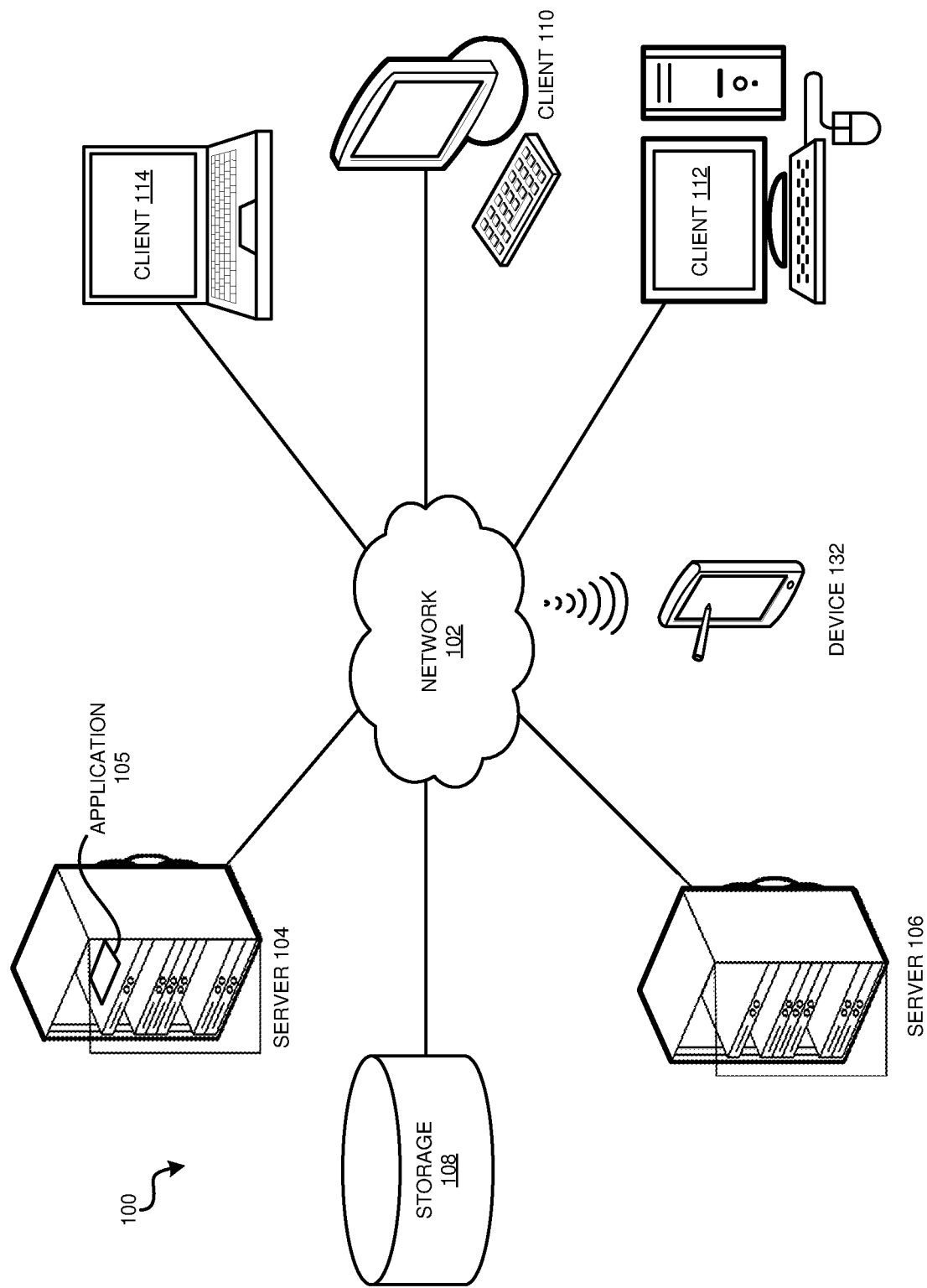
FIG. 1 depicts a block diagram of a network of data processing systems in which illustrative embodiments may be implemented.

The illustrative embodiments recognize that a content repository stores different types of content, such as text documents, audio, still images, and video. However, current search techniques search text. As a result, non-textual content within the content repository, such as audio content, video content, and images of text within video content and still images, is not directly searchable.

The illustrative embodiments also recognize that some non-textual content includes searchable textual metadata. For example, some non-textual content includes metadata such as a text synopsis of the content or caption data reporting words spoken in an audiovisual presentation. However, textual metadata is not required, and not all non-textual content includes searchable metadata. For example, records of users' interactions with computer systems using an audio user interface such as a smart speaker system are often audio-only, without searchable metadata. As another example, because caption data was first implemented in a television standard, audio-only content does not typically include caption data. As a third example, images of text within video content and still images, and data of objects recognized within images and video, are also not typically included in searchable metadata.

The illustrative embodiments also recognize that humans are capable of generating a text version of non-textual content, such as a transcript of audio content and text description of video imagery. Humans are also capable of generating synopses and most caption data. However, to generate text humans must watch or listen to content in real time, and thus are not suited to generating searchable text data quickly enough to respond to a search query from a user in real time.

The illustrative embodiments also recognize that a content repository is often required to store and process non-textual content in a variety of different coding and container formats. Stored and processed content might also be in more than one human language. Thus, in order to search within non-textual content, a user must apply the correct decoder for each file of content, identify a human language within the content, understand the human language or apply an appropriate audio to speech model to generate text from the content, and search the resulting text—a process that requires too much technical and language-specific knowledge for the average user, and is expensive and inefficient as well.

Consequently, the illustrative embodiments recognize that there is an unmet need to automatically generate searchable text data corresponding to non-textual content in a content repository, so that the content can be searched using an existing text search technique. In addition, there is an unmet need to generate the searchable text data quickly enough to respond to a search query from a user in real time. There is also an unmet need to generate searchable text data for non-textual content in multiple formats and different languages.

The illustrative embodiments recognize that the presently available tools or solutions do not address these needs or provide adequate solutions for these needs. The illustrative embodiments used to describe the invention generally address and solve the above-described problems and other problems related to multi-format content repository search.

An embodiment can be implemented as a software application. The application implementing an embodiment can be configured as a modification of an existing content repository or content management system, as a separate application that operates in conjunction with an existing content repository or content management system, a standalone application, or some combination thereof.

Particularly, some illustrative embodiments provide a method that determines a file format of a portion of a natural language content, identifies a human language included in the portion, converts the portion to a corresponding set of text data, indexes the set of text data, and, responsive to a search query, generates a search result using the indexed set of text data.

An embodiment receives, as input, natural language content including one or more of a text, digital audio, still image, or video portion. An embodiment determines an audio file format of an audio portion of a natural language content. To determine an audio file format, an embodiment uses a filename extension of a filename of the content, structured data within the audio portion, or a combination. To determine a video file format, an embodiment uses a filename extension of a filename of the content, structured data within the video portion, or a combination. For example, content with a filename of example1.wav can be assumed to be a container file in the WAV format. Within the WAV format, a standard set of metadata describes the format of the encoded audio data that follows, including information such as the encoding type, number of bits per channel, the number of channels, and the sample rate. As another example, content with a filename of example2.mp4 generally denotes an MPEG-4 file with both audio and video portions, while a filename of example3.m4a denotes an audio-only MPEG-4 file without Digital Rights Management (DRM). Within the MPEG-4 format, a standard set of metadata describes the format of any encoded audio or video data that follows.

To decode audio and video portions of content for processing, an embodiment uses one or more audio and video codecs. A codec (short for coder-decoder) that decodes audio or video data encoded in a standard format. Codecs for specific encoding formats (e.g. lossless pulse code modulation (PCM) for audio or MPEG-H Part 2 for video) are presently available as standardized software components that can be incorporated into an embodiment. One embodiment has access to one or more audio and video codecs via an external service. Another embodiment is configurable to incorporate a codec, rather than using an external service. Implementing a codec as a modular unit, either as an external service or internal to an embodiment, allows for easy reconfiguration to support an additional encoding format or a newly-developed standard for content encoding.

An embodiment uses a trained audio language identification model to identify a human language included in the content. One embodiment divides the content into time segments based on a language identified in a segment. For example, if content includes a conversation in Spanish followed by a conversation in English, the Spanish conversation might be placed in one segment and the English conversation in another segment. Presently available techniques for identifying a language of a spoken utterance or other portion of audio content include models implementing deep learning techniques, for example feed-forward deep neural networks and long short term memory-recurrent neural networks. An audio language identification model is trained before use. During training, the model uses sets of audio data, labelled as to their human language, to learn to identify a particular language expressed by audio content. Presently available techniques for identifying a language also include non-neural network models such as a Gaussian mixture model and hidden Markov model. One embodiment has access to one or more trained audio language identification models via an external service. Another embodiment is configurable to include a trained audio language identification model, rather than using an external service. Implementing a language identification model as a modular unit, either as an external service or internal to an embodiment, allows for easy reconfiguration to support an additional language or improve a particular language identification model.

An embodiment uses an audio to text model, trained on the identified human language, to convert an audio portion, or a segment of an audio portion, of content to a corresponding set of searchable text data. For example, if an audio portion includes a conversation between two speakers, the corresponding set of searchable text data might include a transcript of the conversation. Presently available techniques for converting audio to text include phonetic-based models using separate components and training for each of pronunciation, acoustic and language model components, as well as end-to-end models that jointly learn all three components. An audio to text model is trained before use. During training, the model uses sets of audio data and corresponding text to learn to convert audio content to text data. One embodiment has access to one or more trained audio to text models via an external service. Another embodiment is configurable to include a trained audio to text model, rather than using an external service. Implementing an audio to text model as a modular unit, either as an external service or internal to an embodiment, allows for easy reconfiguration to support an additional language or improve a particular model.

An embodiment uses a trained video to text model to convert the video portion to a corresponding set of searchable text data. Presently available techniques use trained models to recognize objects within video or still images, recognize actions within video or still images, and generate textual descriptions, in a particular human language, of video based on the actions and objects. For example, if a video portion includes a baseball game, the corresponding set of searchable text data might include a list of recognized objects such as a bat, a ball, and particular players, or a text description of a particular player's turn at bat. Presently available techniques also recognize and extract text within video or still images. A video to text model is trained before use. During training, the model uses sets of labelled video data to learn to recognize objects and actions and generate textual descriptions. One embodiment has access to one or more trained video to text models via an external service. Another embodiment is configurable to include a trained video to text model, rather than using an external service. Implementing a video to text model as a modular unit, either as an external service or internal to an embodiment, allows for easy reconfiguration to support an additional language or improve a particular model.

In one embodiment, text data converted from audio or video data includes timestamp data associating a portion of the text data with a corresponding timestamp within the audio or video. Timestamp data allows a user to locate a search result within audio or video content, providing context for the search result. Timestamp data is also usable by other automatic content processing techniques, such as to synchronize or associate a particular segment of audio or video with corresponding text data.

An embodiment tags generated text data with one or more of a set of tags. One tag identifies the human language of the source content used to generate the text data. Another tag identifies a file format of the source content used to generate the text data. Another tag identifies an encoding format of the source content used to generate the text data. Another tag identifies a geographic region of the source content used to generate the text data. Other tags are also possible and contemplated within the scope of the illustrative embodiments. Tags allow a user to filter search results by a particular characteristic of the source content. For example, a user might not want search results from content in a particular language or content that is not accessible in the user's region.

An embodiment indexes the set of text data and saves the indexed set of data as metadata. Although the set of text data is already searchable, indexing the set of text data improves search efficiency and categorization of the data. In embodiments, the metadata includes one or more of a filename of the source content, a path name within a content repository of the source content, any tags associated with the source content, and the text data and any associated timestamps.

An embodiment uses the indexed set of text data to generate a response to a search query including non-textual content. In one type of search query, a user specifies a search query including text to be searched for. A user can also specify one or more search parameters as part of a search query. In embodiments, default search parameters can also be specified, either as part of a user's profile or as system defaults. Some non-limiting examples of additional search parameters include a preferred language for the content or a content language that should not be searched, a file format, an encoding format, and a geographic region of content to be searched. For example, in Unix-like and some other operating systems, find is a command-line utility that locates files based on some user-specified criteria and then applies some requested action on each matched object. Thus, a search query might be "find./-type fA-exec grep 'baseball' { } \;", which recursively searches (using the "grep" command) all the audio content ("-type fA") from the root directory of a repository and returns all instances of the word "baseball".

In one embodiment, identifying a content's format, identifying a human language, converting non-textual content to text data, and indexing the text data are performed in response to adding the content to a content repository. In another embodiment, identifying a content's format, identifying a human language, converting non-textual content to text data, and indexing the text data are performed in response to receiving a search query referencing the content. A user need not specify text to be searched for, but instead specify other types of metadata, such as all instances of a particular recognized voice or object. In addition, the search query need not be expressed in textual form, and instead be input via voice or another user interface format.

The manner of multi-format content repository search described herein is unavailable in the presently available methods in the technological field of endeavor pertaining to content management. A method of an embodiment described herein, when implemented to execute on a device or data processing system, comprises substantial advancement of the functionality of that device or data processing system in determining a file format of a portion of a natural language content, identifying a human language included in the portion, converting the portion to a corresponding set of text data, indexing the set of text data, and, responsive to a search query, generating a search result using the indexed set of text data.

The illustrative embodiments are described with respect to certain types of contents, audio portions of contents, video portions of contents, file formats, encoding formats, searches, responses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
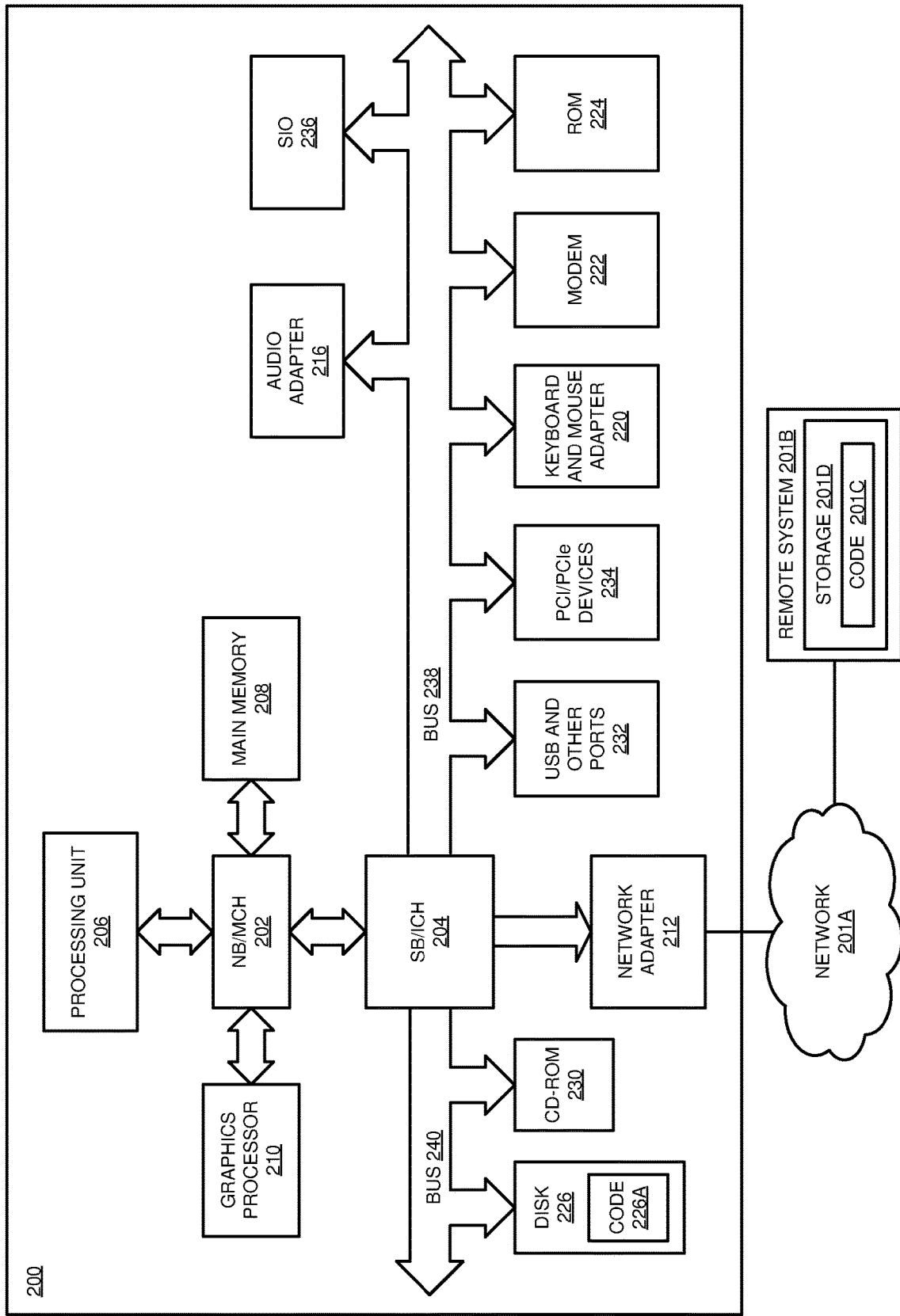
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
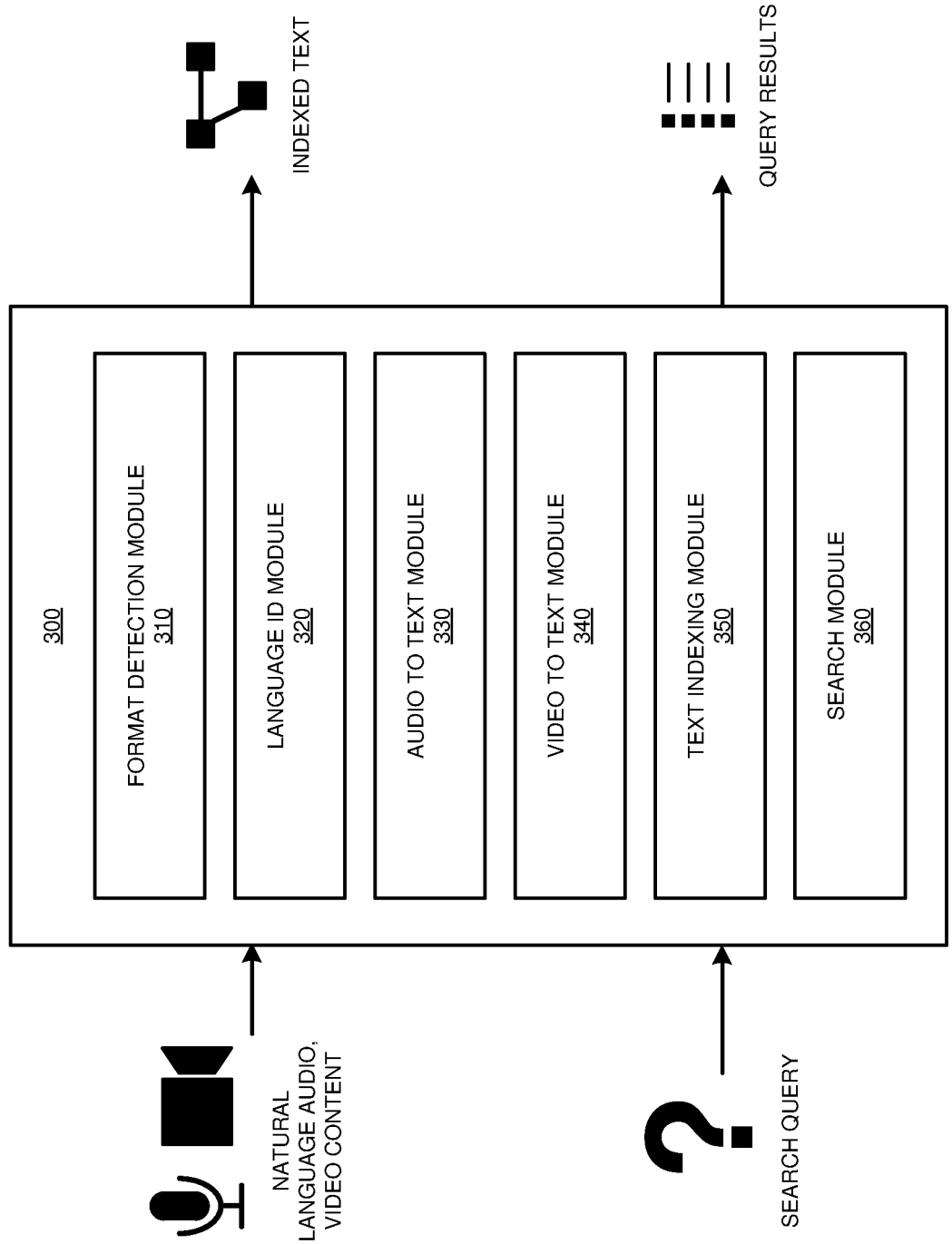
FIG. 3 depicts a block diagram of an example configuration for multi-format content repository search in accordance with an illustrative embodiment.

With reference to FIG. 3, this figure depicts a block diagram of an example configuration for multi-format content repository search in accordance with an illustrative embodiment. Application 300 is an example of application 105 in FIG. 1 and executes in any of servers 104 and 106, clients 110, 112, and 114, and device 132 in FIG. 1.

Application 300 receives, as input, natural language content including one or more of a text, digital audio, still image, or video portion. Format detection module 310 determines an audio file format of an audio portion of a natural language content. To determine an audio file format, module 310 uses a filename extension of a filename of the content, structured data within the audio portion, or a combination. To determine a video file format, module 310 uses a filename extension of a filename of the content, structured data within the video portion, or a combination.

To decode audio and video portions of content for processing, application 300 uses one or more audio and video codecs. One implementation of application 300 has access to one or more audio and video codecs via an external service. Another implementation of application 300 is configurable to incorporate a codec, rather than using an external service.

Language identification module 320 uses a trained audio language identification model to identify a human language included in the content. An audio language identification model is trained before use. One implementation of module 320 divides the content into time segments based on a language identified in a segment. One implementation of module 320 has access to one or more trained audio language identification models via an external service. Another implementation of module 320 is configurable to include a trained audio language identification model, rather than using an external service.

Audio to text module 330 uses an audio to text model, trained on the identified human language, to convert an audio portion, or a segment of an audio portion, of content to a corresponding set of searchable text data. An audio to text model is trained before use. One implementation of module 330 has access to one or more trained audio to text models via an external service. Another implementation of module 330 is configurable to include a trained audio to text model, rather than using an external service.

Video to text module 340 uses a trained video to text model to convert the video portion to a corresponding set of searchable text data. A video to text model is trained before use. One implementation of module 340 has access to one or more trained video to text models via an external service. Another implementation of module 340 is configurable to include a trained video to text model, rather than using an external service.

In some implementations of module 330 and module 340, text data converted from audio or video data includes timestamp data associating a portion of the text data with a corresponding timestamp within the audio or video.

Application 300 tags generated text data with one or more of a set of tags. One tag identifies the human language of the source content used to generate the text data. Another tag identifies a file format of the source content used to generate the text data. Another tag identifies an encoding format of the source content used to generate the text data. Another tag identifies a geographic region of the source content used to generate the text data. Other tags are also possible.

Text indexing module 350 indexes the set of text data and saves the indexed set of data as metadata. In implementations of module 350, the metadata includes one or more of a filename of the source content, a path name within a content repository of the source content, any tags associated with the source content, and the text data and any associated timestamps.

Search module 360 uses the indexed set of text data to generate a response to a search query including non-textual content. In particular, module 360 receives a search query including text to be searched for. The search query can also include one or more additional search parameters. A search parameter can be specified as part of a search query. Default search parameters can also be specified, either as part of a user's profile or as system defaults. Some non-limiting examples of additional search parameters include a preferred language for the content or a content language that should not be searched, a file format, an encoding format, and a geographic region of content to be searched.

In one implementation of application 300, identifying a content's format, identifying a human language, converting non-textual content to text data, and indexing the text data are performed in response to adding the content to a content repository. In another implementation of application 300, identifying a content's format, identifying a human language, converting non-textual content to text data, and indexing the text data are performed in response to receiving a search query referencing the content.

Figure 4:
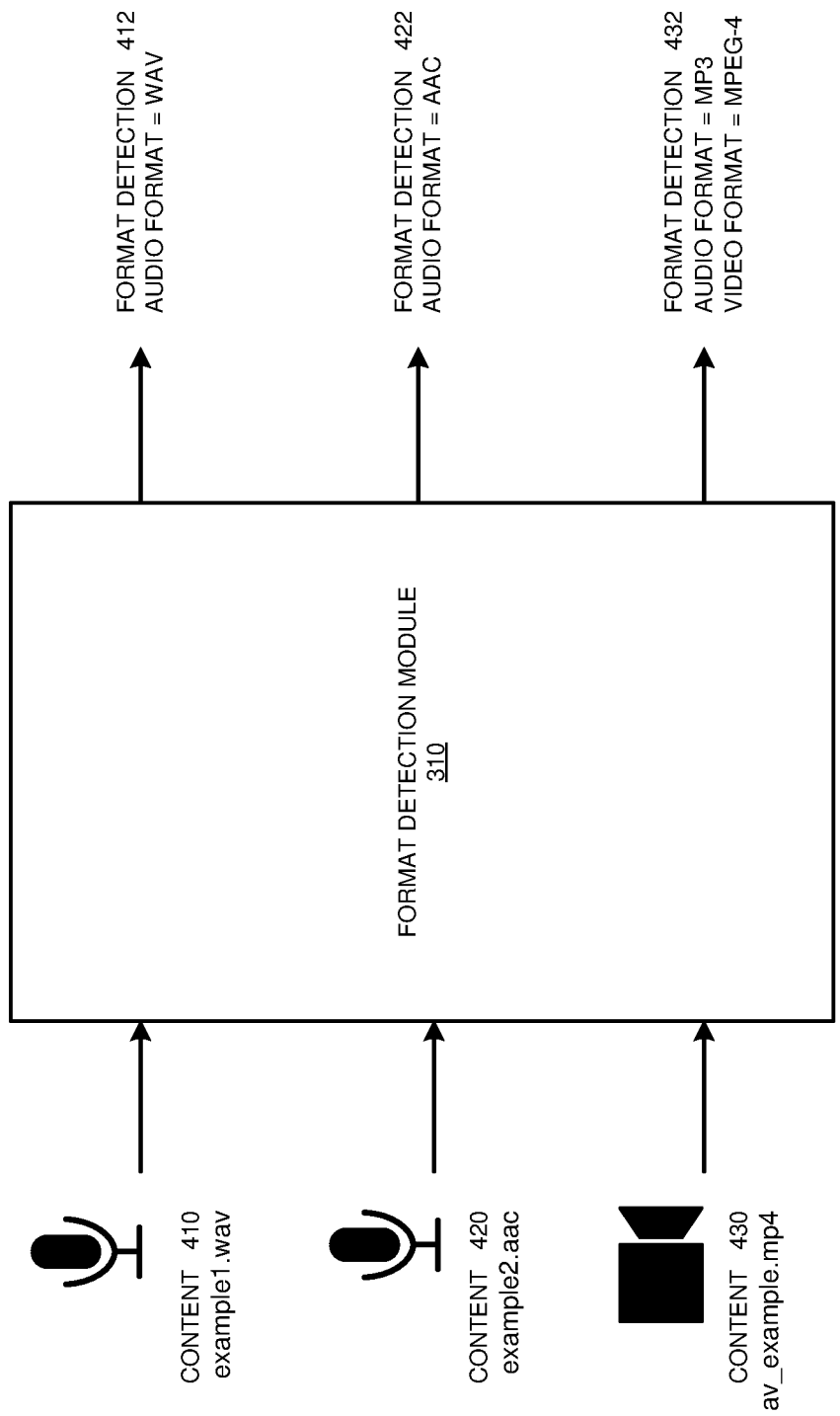
FIG. 4 depicts an example of multi-format content repository search in accordance with an illustrative embodiment.

With reference to FIG. 4, this figure depicts an example of multi-format content repository search in accordance with an illustrative embodiment. The example can be executed using application 300 in FIG. 3. Format detection module 310 is the same as format detection module 310 in FIG. 3.

As depicted, module 310 receives content 410, with a filename of example1.wav. Module 310 examines the filename extension (.wav) and structured data within content 410 and determines format detection 412: content 410 is audio content with a file format of type WAV. Module 310 also determines, from metadata in content 410, the format of the encoded audio data that follows, including information such as the encoding type, number of bits per channel, the number of channels, and the sample rate.

Module 310 also receives content 420, with a filename of example2.aac. Module 310 examines the filename extension (.aac) and structured data within content 420 and determines format detection 422: content 420 is audio content with a file format of type Advanced Audio Coding (AAC). Module 310 also determines, from metadata in content 420, the format of the encoded audio data that follows.

Module 310 also receives content 430, with a filename of av_example.mp4. Module 310 examines the filename extension (.mp4) and structured data within content 430 and determines format detection 432: content 430 includes an audio portion in MP3 format and a video portion in MPEG-4 format. Module 310 also determines, from metadata in content 430, the format of the encoded audio and video data of each portion.

Figure 5:
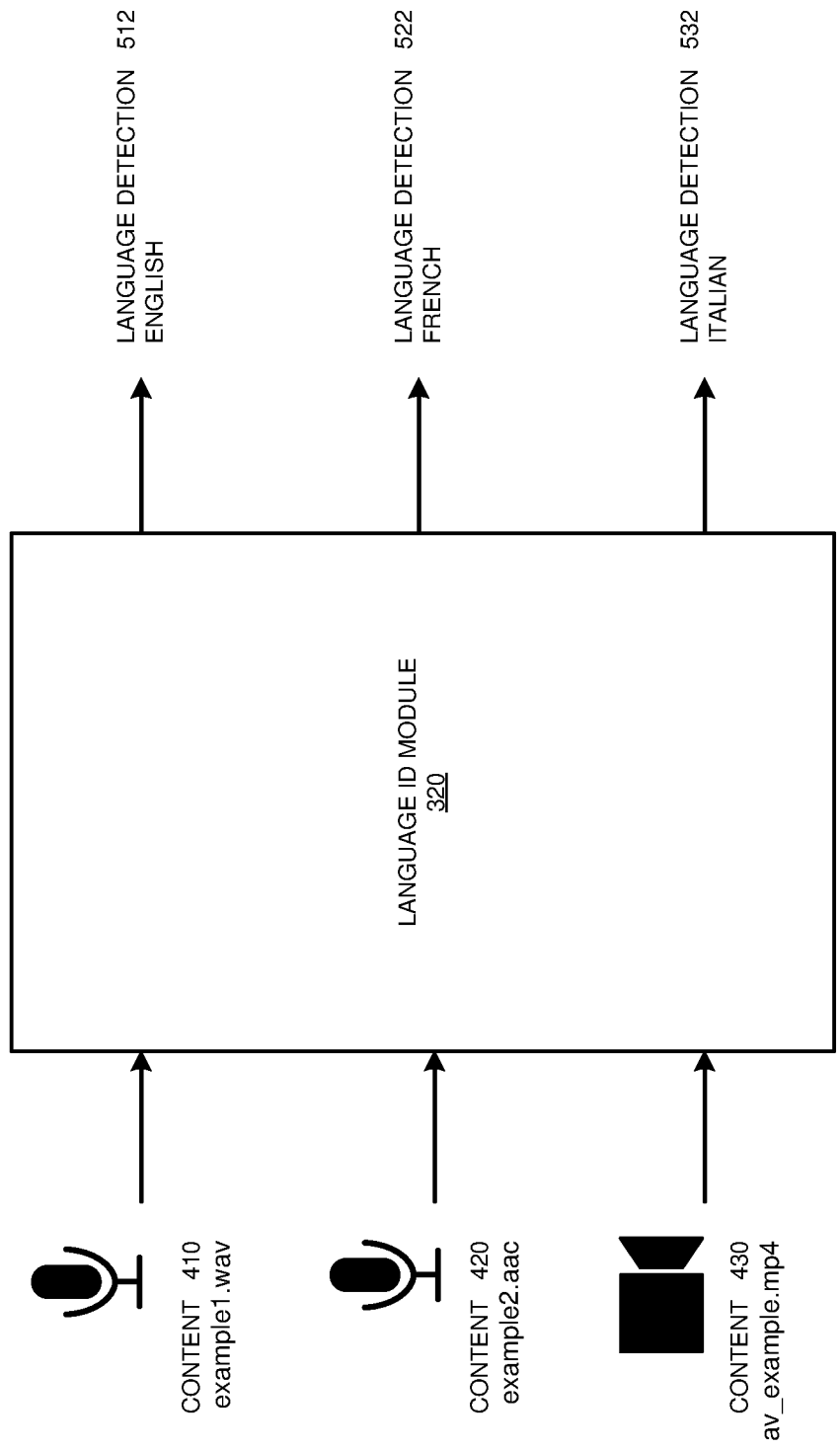
FIG. 5 depicts a continued example of multi-format content repository search in accordance with an illustrative embodiment.

With reference to FIG. 5, this figure depicts a continued example of multi-format content repository search in accordance with an illustrative embodiment. Language identification module 320 is the same as language identification module 320 in FIG. 3. Contents 410, 420, and 430 are the same as contents 410, 420, and 430 in FIG. 4.

As depicted, module 320 receives content 410 and uses a trained audio language identification model to identify a human language included in the content: language detection 512. Similarly, module 320 determines language detection 522 from content 420, and determines language detection 532 from content 430. Note that each example content includes only one language only for simplicity in the example, and each content could include multiple languages.

Figure 6:
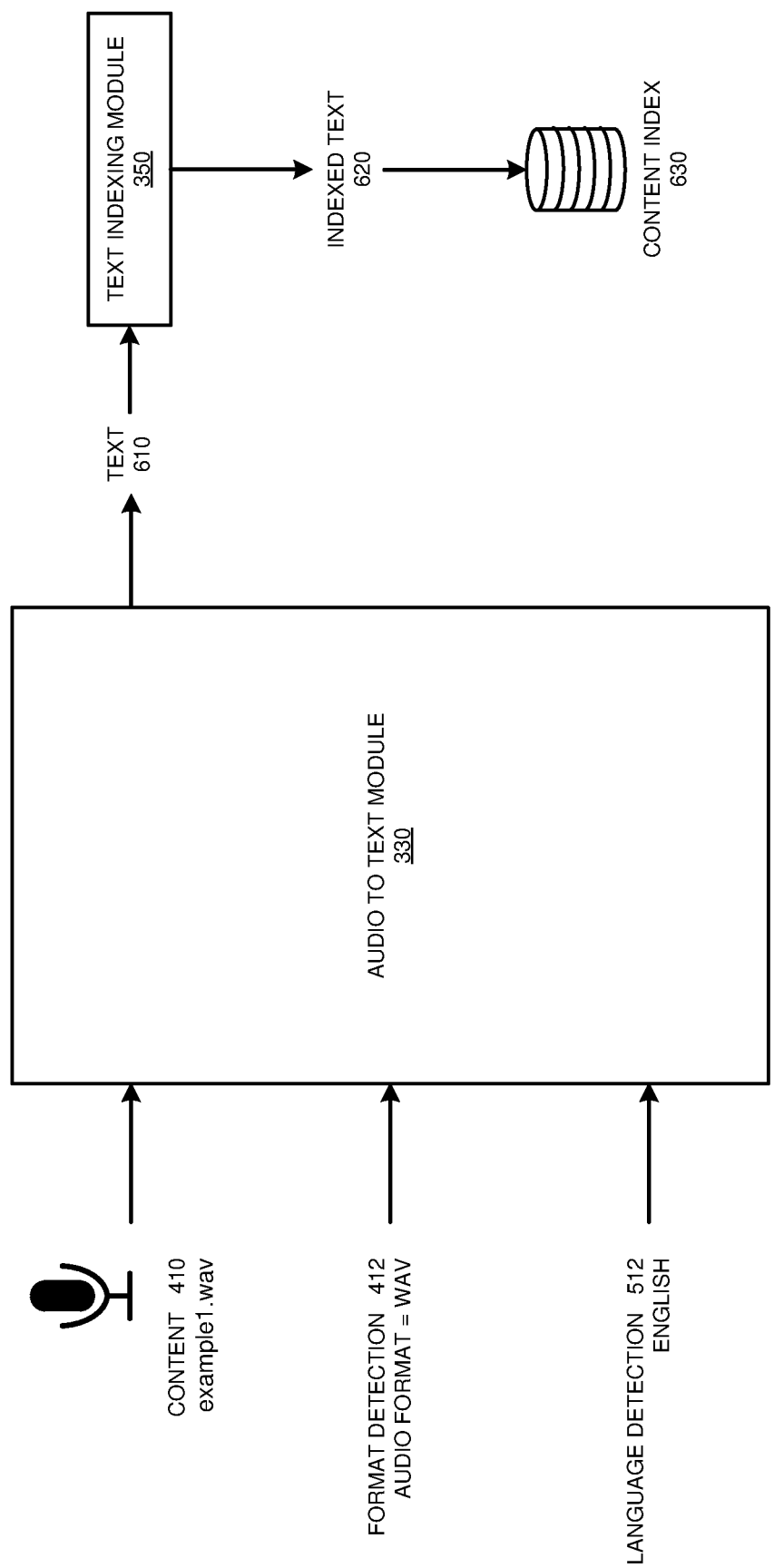
FIG. 6 depicts a continued example of multi-format content repository search in accordance with an illustrative embodiment.

With reference to FIG. 6, this figure depicts a continued example of multi-format content repository search in accordance with an illustrative embodiment. Audio to text module 330 and text indexing module 350 are the same as audio to text module 330 and text indexing module 350 in FIG. 3. Content 410 and format detection 412 are the same as content 410 and format detection 412 in FIG. 4. Language detection 512 is the same as language detection 512 in FIG. 5.

As depicted, module 330 uses format detection 412 and language detection 512 to select an appropriate audio to text model, and uses the selected model to convert an audio portion of content 410 to text 610. Module 350 indexes text 610, creating indexed text 620. and saves indexed text 620 in content index 630.

Figure 7:
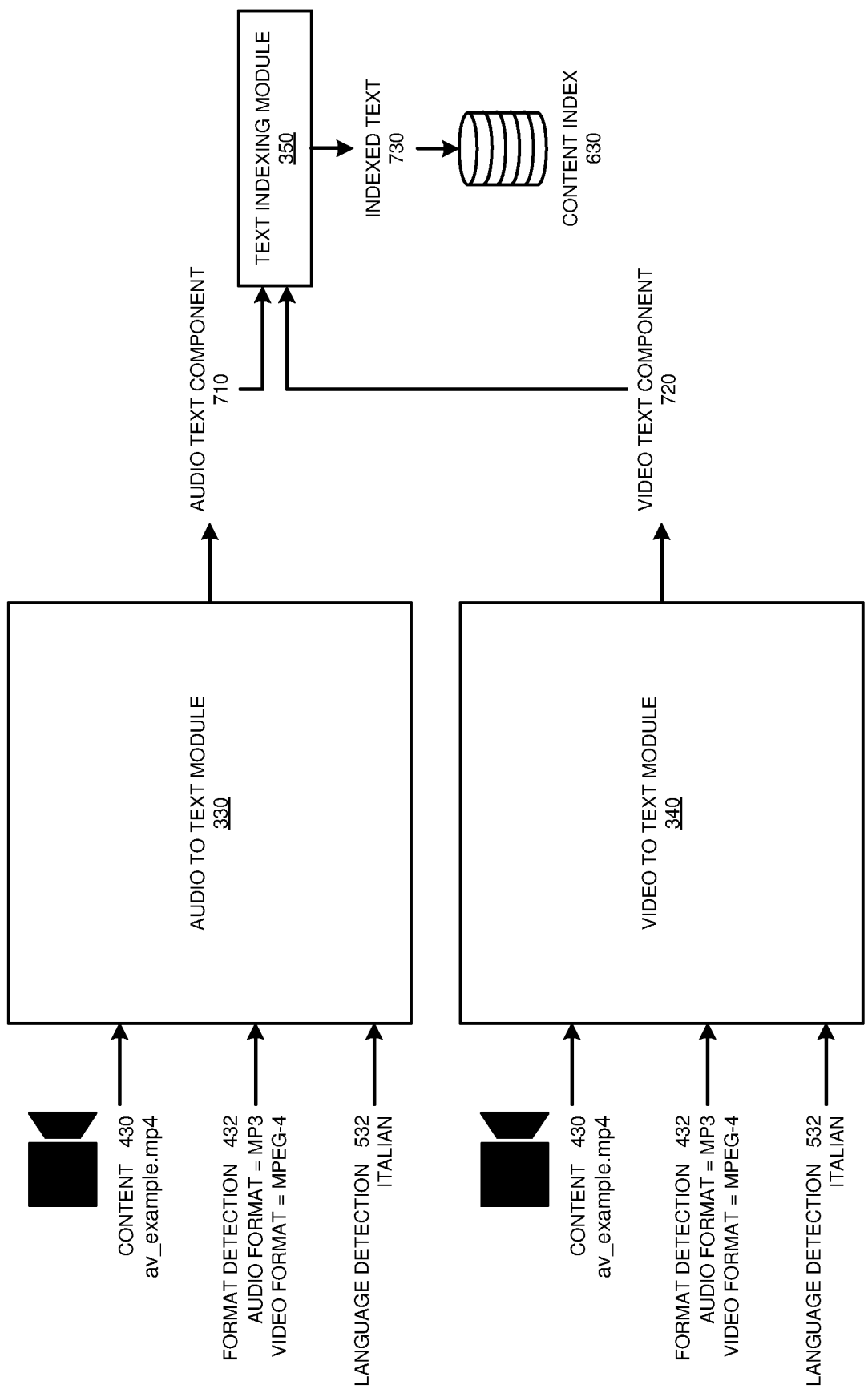
FIG. 7 depicts a continued example of multi-format content repository search in accordance with an illustrative embodiment.

With reference to FIG. 7, this figure depicts a continued example of multi-format content repository search in accordance with an illustrative embodiment. Audio to text module 330, video to text module 340, and text indexing module 350 are the same as audio to text module 330, video to text module 340, and text indexing module 350 in FIG. 3. Content 430 and format detection 432 are the same as content 430 and format detection 432 in FIG. 4. Language detection 532 is the same as language detection 532 in FIG. 5.

As depicted, module 330 uses format detection 432 and language detection 532 to select an appropriate audio to text model, and uses the selected model to convert an audio portion of content 430 to audio text component 710. Module 340 uses format detection 432 and language detection 532 to select an appropriate video to text model, and uses the selected model to convert a video portion of content 430 to video text component 720. Module 350 indexes text components 710 and 720, creating indexed text 730. and saves indexed text 730 in content index 630.

Figure 8:
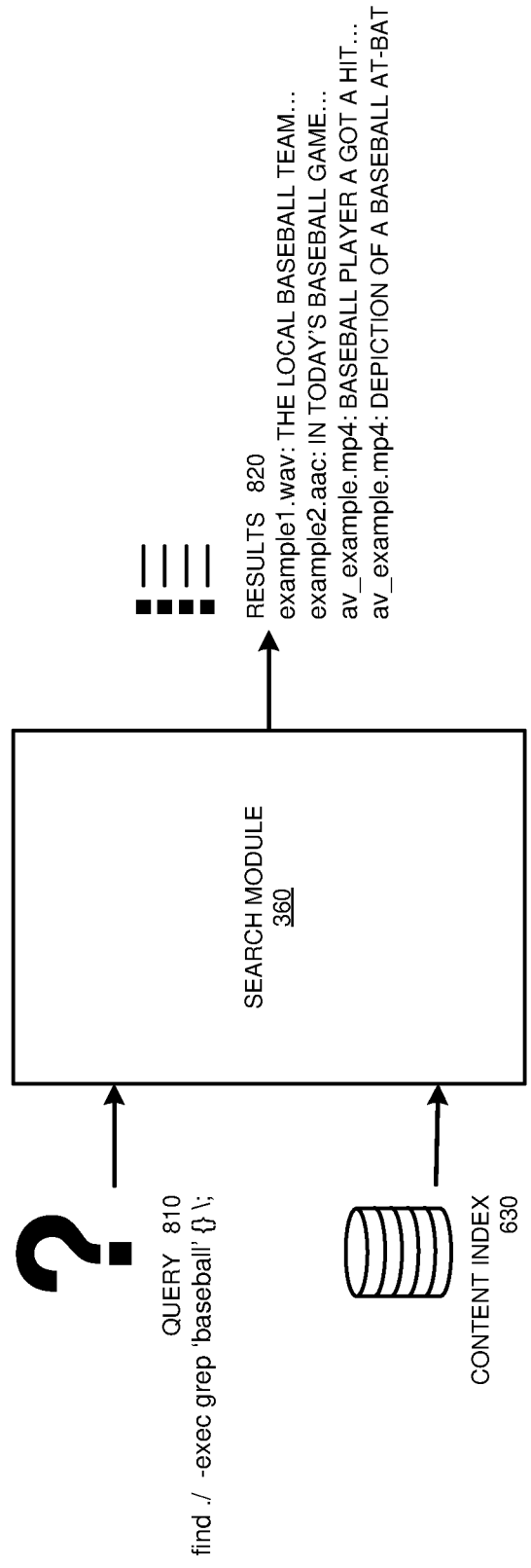
FIG. 8 depicts a continued example of multi-format content repository search in accordance with an illustrative embodiment.

With reference to FIG. 8, this figure depicts a continued example of multi-format content repository search in accordance with an illustrative embodiment. Search module 360 is the same as search module 360 in FIG. 3. Content index 630 is the same as content index 630 in FIG. 6.

As depicted, search module 360 uses content index 630 to generate a response to search query 810, specifying a recursive search for all content including the word "baseball". The results are depicted in results 820.

Figure 9:
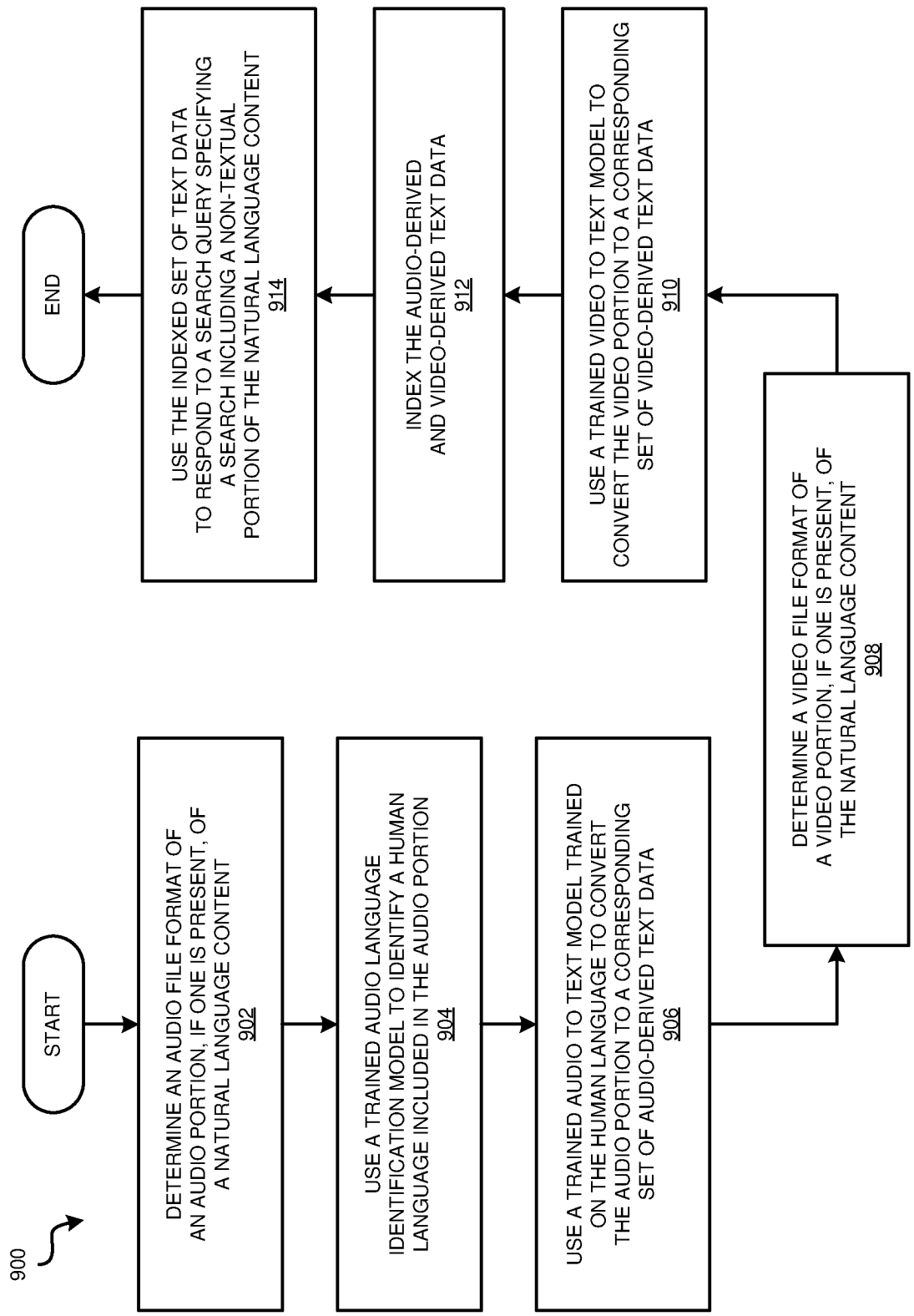
FIG. 9 depicts a flowchart of an example process for multi-format content repository search in accordance with an illustrative embodiment.

With reference to FIG. 9, this figure depicts a flowchart of an example process for multi-format content repository search in accordance with an illustrative embodiment. Process 900 can be implemented in application 300 in FIG. 3.

In block 902, the application determines an audio file format of an audio portion, if one is present, of a natural language content. In block 904, the application uses a trained audio language identification model to identify a human language included in the audio portion. In block 906, the application uses a trained audio to text model trained on the human language to convert the audio portion to a corresponding set of audio-derived text data. In block 908, the application determines a video file format of a video portion, if one is present, of the natural language content. In block 910, the application uses a trained video to text model to convert the video portion to a corresponding set of video-derived text data In block 912, the application indexes the audio-derived and video-derived text data. In block 914, the application uses the indexed set of text data to respond to a search query specifying a search including a non-textual portion of the natural language content. Then the application ends.

Figure 10:
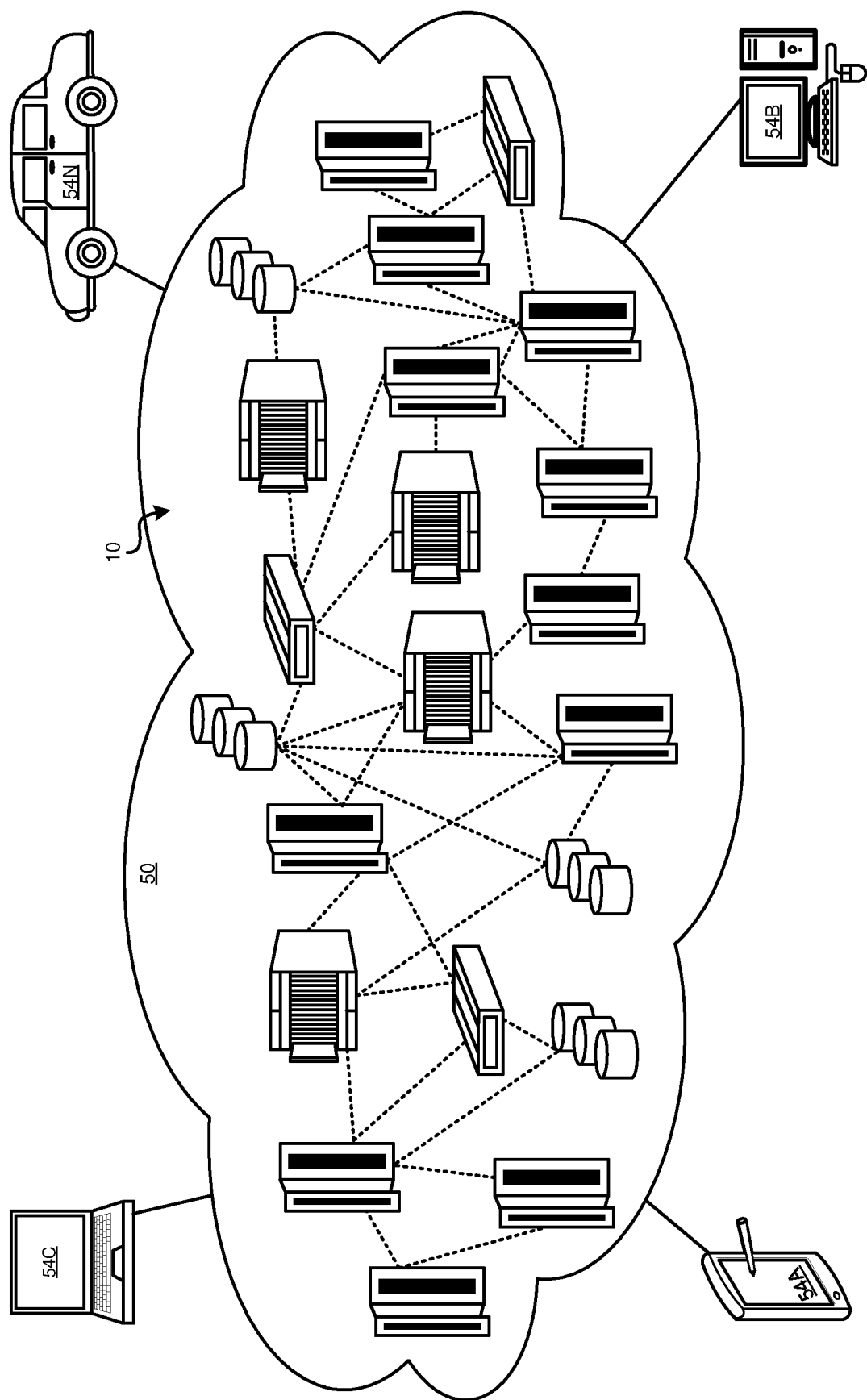
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 11:
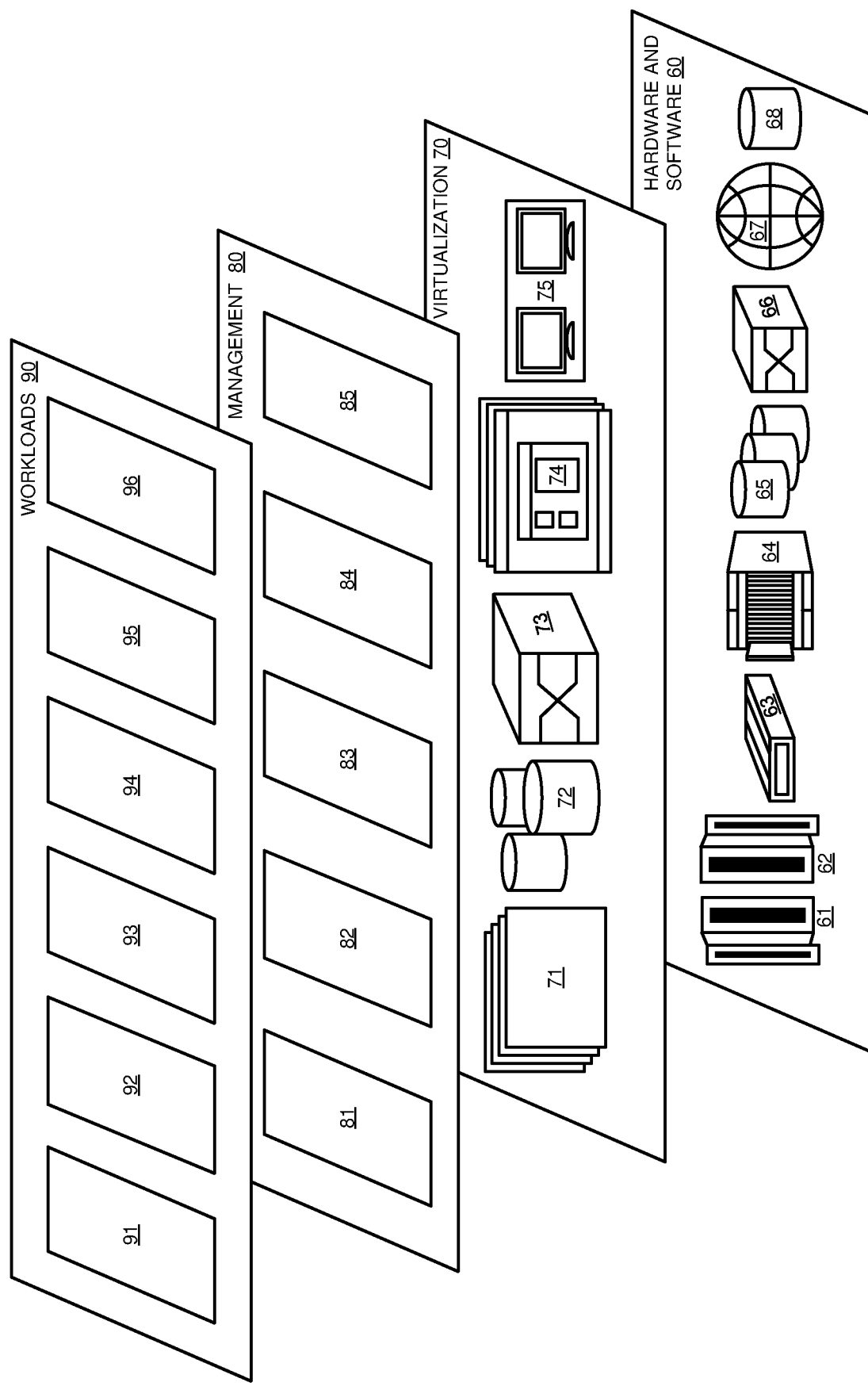
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for multi-format content repository search and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    identifying, using metadata within a natural language content file, a coding format of an audio portion of the natural language content file, the audio portion comprising digital audio data encoded according to the coding format;
    decoding, using an audio codec, the encoded audio portion, the audio codec selected according to the coding format, the decoding resulting in a second audio portion;
    selecting, using a trained audio language identification model, a trained audio to text model, the selected trained audio to text model trained to convert audio of a human language identified by the trained audio language identification model as included in the second audio portion to corresponding text;
    converting, using the selected trained audio to text model, the second audio portion to a corresponding set of text data;
    indexing the set of text data, the indexing generating an indexed set of text data; and
    generating, using the indexed set of text data responsive to a search query, a search result, the search query specifying a search including a non-textual portion of the natural language content.

2. The computer-implemented method of claim 1, further comprising:
    determining a video file format of a video portion of the natural language content;

converting, using a trained video to text model, the video portion to a corresponding set of video-derived text data; and adding, to the set of text data, the set of video-derived text data.

3. The computer-implemented method of claim 2, further comprising:

decoding, using a video codec, the video portion, the video codec selected according to video metadata identified according to the video file format.

4. The computer-implemented method of claim 1, wherein the converting is performed responsive to detecting an addition of the natural language content to a content repository.

5. The computer-implemented method of claim 1, wherein the converting is performed responsive to receiving the search query.

6. The computer-implemented method of claim 1, wherein the set of text data comprises timestamp data associating a portion of the set of text data with a corresponding timestamp within the audio portion.

7. A computer program product for content repository search, the computer program product comprising:

one or more computer readable storage media, and program instructions collectively stored on the one or more computer readable storage media, the program instructions comprising:

program instructions to identify, using metadata within a natural language content file, a coding format of an audio portion of the natural language content file, the audio portion comprising digital audio data encoded according to the coding format;

program instructions to decode, using an audio codec, the encoded audio portion, the audio codec selected according to the coding format, the decoding resulting in a second audio portion;

program instructions to select, using a trained audio language identification model, a trained audio to text model, the selected trained audio to text model trained to convert audio of a human language identified by the trained audio language identification model as included in the second audio portion to corresponding text;

program instructions to convert, using the selected trained audio to text model, the second audio portion to a corresponding set of text data;

program instructions to index the set of text data, the indexing generating an indexed set of text data; and program instructions to generate, using the indexed set of text data responsive to a search query, a search result, the search query specifying a search including a non-textual portion of the natural language content.

8. The computer program product of claim 7, further comprising:

program instructions to determine a video file format of a video portion of the natural language content;

program instructions to convert, using a trained video to text model, the video portion to a corresponding set of video-derived text data; and program instructions to add, to the set of text data, the set of video-derived text data.

9. The computer program product of claim 8, further comprising:

program instructions to decode, using a video codec, the video portion, the video codec selected according to video metadata identified according to the video file format.

10. The computer program product of claim 7, wherein the converting is performed responsive to detecting an addition of the natural language content to a content repository.

11. The computer program product of claim 7, wherein the converting is performed responsive to receiving the search query.

12. The computer program product of claim 7, wherein the set of text data comprises timestamp data associating a portion of the set of text data with a corresponding timestamp within the audio portion.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to identify, using metadata within a natural language content file, a coding format of an audio portion of the natural language content file, the audio portion comprising digital audio data encoded according to the coding format;

program instructions to decode, using an audio codec, the encoded audio portion, the audio codec selected according to the coding format, the decoding resulting in a second audio portion;

program instructions to select, using a trained audio language identification model, a trained audio to text model, the selected trained audio to text model trained to convert audio of a human language identified by the trained audio language identification model as included in the second audio portion to corresponding text;

program instructions to convert, using the selected trained audio to text model, the second audio portion to a corresponding set of text data;

program instructions to index the set of text data, the indexing generating an indexed set of text data; and program instructions to generate, using the indexed set of text data responsive to a search query, a search result, the search query specifying a search including a non-textual portion of the natural language content.

17. The computer system of claim 16, further comprising:

program instructions to determine a video file format of a video portion of the natural language content;

program instructions to convert, using a trained video to text model, the video portion to a corresponding set of video-derived text data; and program instructions to add, to the set of text data, the set of video-derived text data.

\* \* \* \* \*